No. 895,567. PATENTED AUG. 11, 1908.
F. L. HUSTED.
AXLE LUBRICATOR.
APPLICATION FILED JUNE 12, 1907.
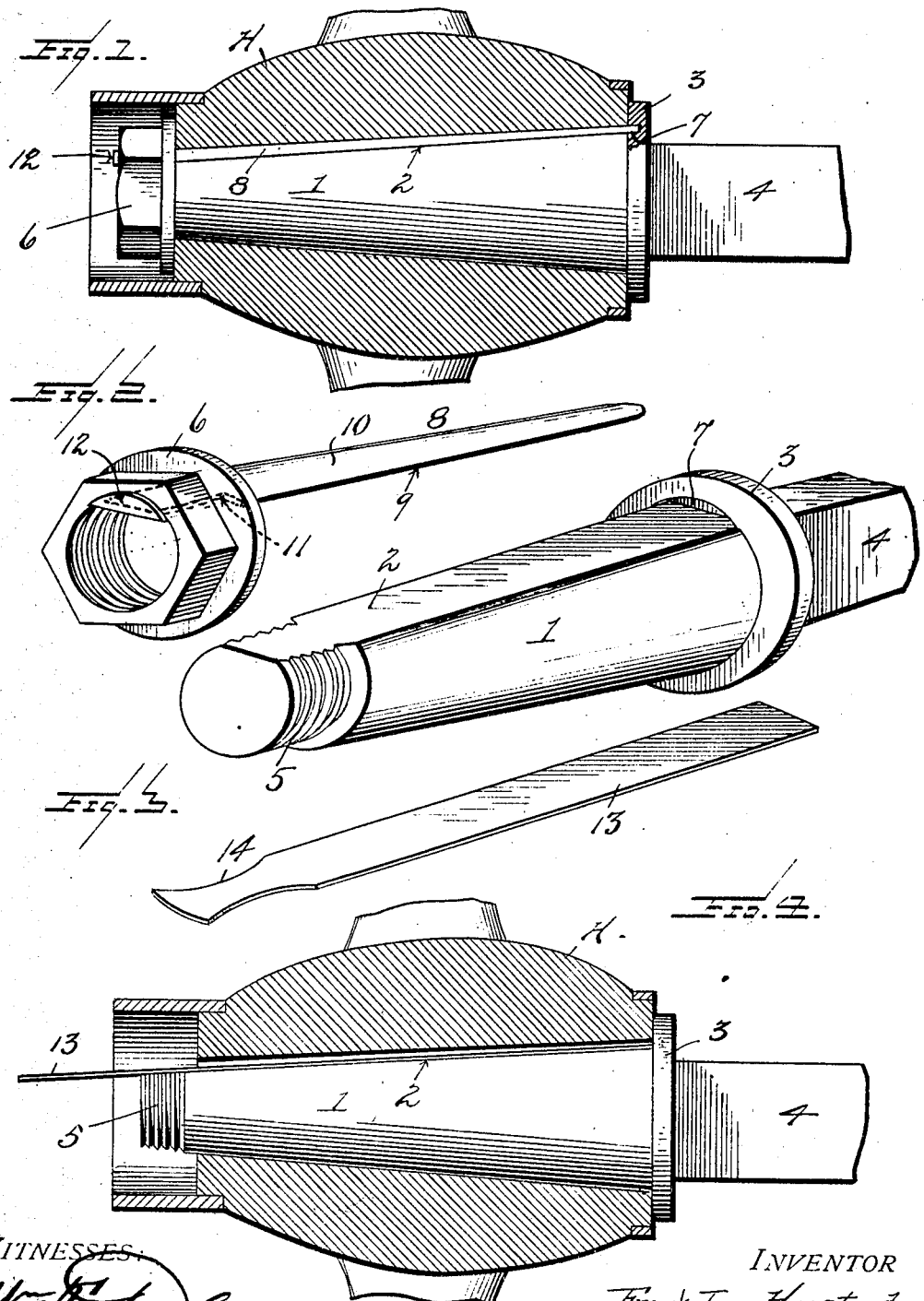
WITNESSES:
R. C. Braddock.
INVENTOR
Frank L. Husted
BY
Attorney

UNITED STATES PATENT OFFICE.

FRANK L. HUSTED, OF HICKSVILLE, OHIO.

AXLE-LUBRICATOR.

No. 895,567.     Specification of Letters Patent.     Patented Aug. 11, 1908.

Application filed June 12, 1907. Serial No. 378,570.

*To all whom it may concern:*

Be it known that I, FRANK L. HUSTED, a citizen of the United States, residing at Hicksville, in the county of Defiance and State of Ohio, have invented certain new and useful Improvements in Axle-Lubricators, of which the following is a specification.

This invention relates to the subject of lubricators for vehicle axles, and has special reference to an improved axle lubricating means comprising an intimate part of the axle spindle construction, while at the same time, providing for the effectual and uniform oiling of the spindle without even a partial removal of the vehicle wheel.

The common methods of applying lubricant to the axle spindle of vehicle wheels are open to many objections. Ordinarily, a well known manner of applying lubricant to an axle is first to jack up one corner of the vehicle and take off the wheel, and where a jack is not available, the axle ends must be raised by hand sufficiently to permit the wheel to be slipped partly off, so as to expose the axle spindle for oiling purposes. Again, another method heretofore employed is to pour the lubricant through an oiling hole in the wheel hub, but this and the other methods referred to, are open to many objections which it is the purpose of the present invention to obviate.

With these and other objects in view, which will readily appear as the nature of the invention is better understood, the same consists in the novel contsruction, combination and arrangement of parts hereinafter more fully described, illustrated and claimed.

A preferable embodiment of the invention is shown in the drawings, in which—

Figure 1 is a sectional view of a vehicle wheel hub, and axle spindle, the latter embodying the construction contemplated by the present invention. Fig. 2 is a perspective view of the axle spindle construction, illustrating the lubricating spindle slide-section and axle nut separated from the body of the spindle. Fig. 3 is a detail in perspective of the hand applying-blade. Fig. 4 is a view similar to Fig. 1, showing the spindle-slide section and axle nut removed, and the applying-blade inserted within the axle box, as in the act of applying the lubricant to the oiling flat of the spindle.

Like references designate corresponding parts in the several figures of the drawings.

In carrying out the invention, the distinctive feature thereof resides in forming the upper side or surface of an axle spindle 1 with what may be termed an oiling flat 2. This oiling flat is provided by mutilating the top portion of the spindle 1 from the extreme outer tip to the inner axle collar 3 occupying its usual location at the wide end or base of the spindle where the same unites with the body portion 4 of the axle proper. The said flat lies in a horizontal plane and is of sufficient width to provide a wide surface for the reception and distribution of the lubricant.

The spindle 1 is provided at its outer end with the usual threaded bolt stem 5 mutilated at its top side by the outer end portion of the flat 2, and accommodating thereon the usual axle nut 6. At the inner end of the spindle, and in the longitudinal plane of the flat 2, the collar 3 is provided with a keeper socket 7 adapted to receive, for retaining purposes, the inner extremity of a spindle slide section 8. The said slide section 8 consists of a segmental mating part of the axle spindle, that is to say, said slide-section is segmental in cross section, is co-extensive in length and width with the flat 2, and accurately matches or registers with the latter, so that when in place, the slide section constitutes the rounded top part of the axle spindle. The segmental cross section of the slide-spindle provides the same with a flat bottom face 9 and with a convex upper side 10.

At its outer end portion, the slide section is formed with a shouldered coupling neck 11 projecting through and loosely interlocking with the axle nut 6, and at the outer end of the coupling neck, the slide section is provided with a laterally projecting bearing head or lug 12 overlying the outer side of the nut 6.

Associated with the parts described, as a part of the axle lubricating means, is a hand applying-blade 13, consisting of a long flat rectangular blade of sheet metal or other material provided at one end with a handle 14 for manipulating purposes.

In the use of the present invention, it will be understood that when it is desired to lubricate the axle, it is simply necessary to unscrew the nut which, by reason of its interlocked connection with the slide section, will necessarily partly withdraw the slide section so that when the nut is free entirely, the outer end of the slide section is grasped and such section entirely removed, thereby leaving an oiling cavity above the flat 2 with the wheel hub left entirely on the spindle. Then a quantity of lubricant is placed on one end of the applying blade 13 and the latter inserted into the hub H over the flat 2. By means of the blade 13, the lubricant is carried over the full length of the flat and into the keeper socket 7. Then a quantity of lubricant is applied to the rounded side 10 of the slide 8, and the latter readjusted to its place, sliding it over the blade 13 before the withdrawal of the latter. After such withdrawal of the blade 13, the nut is replaced and the result of the operation is that a substantial quantity of grease has been placed next to the collar where the greatest bearing occurs besides leaving a line of lubricant in the slits along the longitudinal edges of the slide section, as well as on top of the latter.

I claim—

An axle lubricator comprising the axle spindle provided on its upper side with a longitudinal oiling flat, an axle collar carried by said axle spindle and being provided with a keeper socket in the plane of said flat, an axle nut, and a slide section having a flat bottom face matching the oiling flat and a convexed upper side, the inner end of said slide engaging said keeper socket, and the outer end being passed through said nut and provided with an upturned flange whereby said slide section may be loosely interlocked with said nut.

In testimony whereof I hereunto affix my signature in the presence of two witnesses.

FRANK L. HUSTED.

Witnesses:
J. L. BERINGTON,
WILLIAM PURDY.